US005558403A

United States Patent [19]

Hammoud et al.

[11] Patent Number: 5,558,403
[45] Date of Patent: Sep. 24, 1996

[54] SEAT RECLINER

[75] Inventors: Majid Hammoud, Northville; Fred C. Kresky, Rochester Hills; Jay P. McCarthy, Livonia, all of Mich.

[73] Assignee: Atoma International, Inc., Ontario, Canada

[21] Appl. No.: 377,007

[22] Filed: Jan. 23, 1995

[51] Int. Cl.⁶ .................................................. B60N 2/02
[52] U.S. Cl. ...................... 297/378.12; 297/367
[58] Field of Search ........................ 297/378.12, 378.1, 297/367, 366

[56] References Cited

U.S. PATENT DOCUMENTS

| | | | |
|---|---|---|---|
| 4,268,086 | 5/1981 | Okuyama | 297/378.12 X |
| 4,312,537 | 1/1982 | Lindenberg | 297/378.12 X |
| 4,629,252 | 12/1986 | Myers et al. | 297/366 |
| 4,874,205 | 10/1989 | Arefinejad et al. | 297/378.12 |
| 5,028,091 | 7/1991 | Zaveri | 297/378.12 X |
| 5,383,710 | 1/1995 | Premji | 297/378.12 |

Primary Examiner—Milton Nelson, Jr.
Attorney, Agent, or Firm—Cushman Darby & Cushman, L.L.P.

[57] ABSTRACT

A connector structure for connecting a rigid member disposed towards the lower portion of one side of an automobile seat back to a rearward portion of an automobile seat. The connector structure enables the seat back to be reclined at varying angles by being pivoted about a first pivot point, and further enables the seat back to be positioned so that a back surface thereof provides a horizontal cargo support by being pivoted about a second pivot point. The connector structure comprises a seat member, an arm with a releasable locking assembly, a latch assembly, and a lever mechanism. The lever mechanism is manually movable to disable the latch assembly and thereby permit the arm to be moved about the first pivot point so that the seat back can be reclined at varying angles. The lever mechanism is also manually movable to release the releasable locking assembly to permit movement of the rigid member of the seat back with respect to the arm about the second pivot point and thereby enable the seat back to be pivotally movable between the dress-up and dump positions. The lever mechanism is manually releasable to selectively enable the latch assembly to lock the arm so as to set the angle at which the back is reclined with respect to the seat and enable the releasable locking assembly to lock the rigid member against movement so as to rigidly maintain the seat back in one of the dress-up and dump positions.

18 Claims, 9 Drawing Sheets

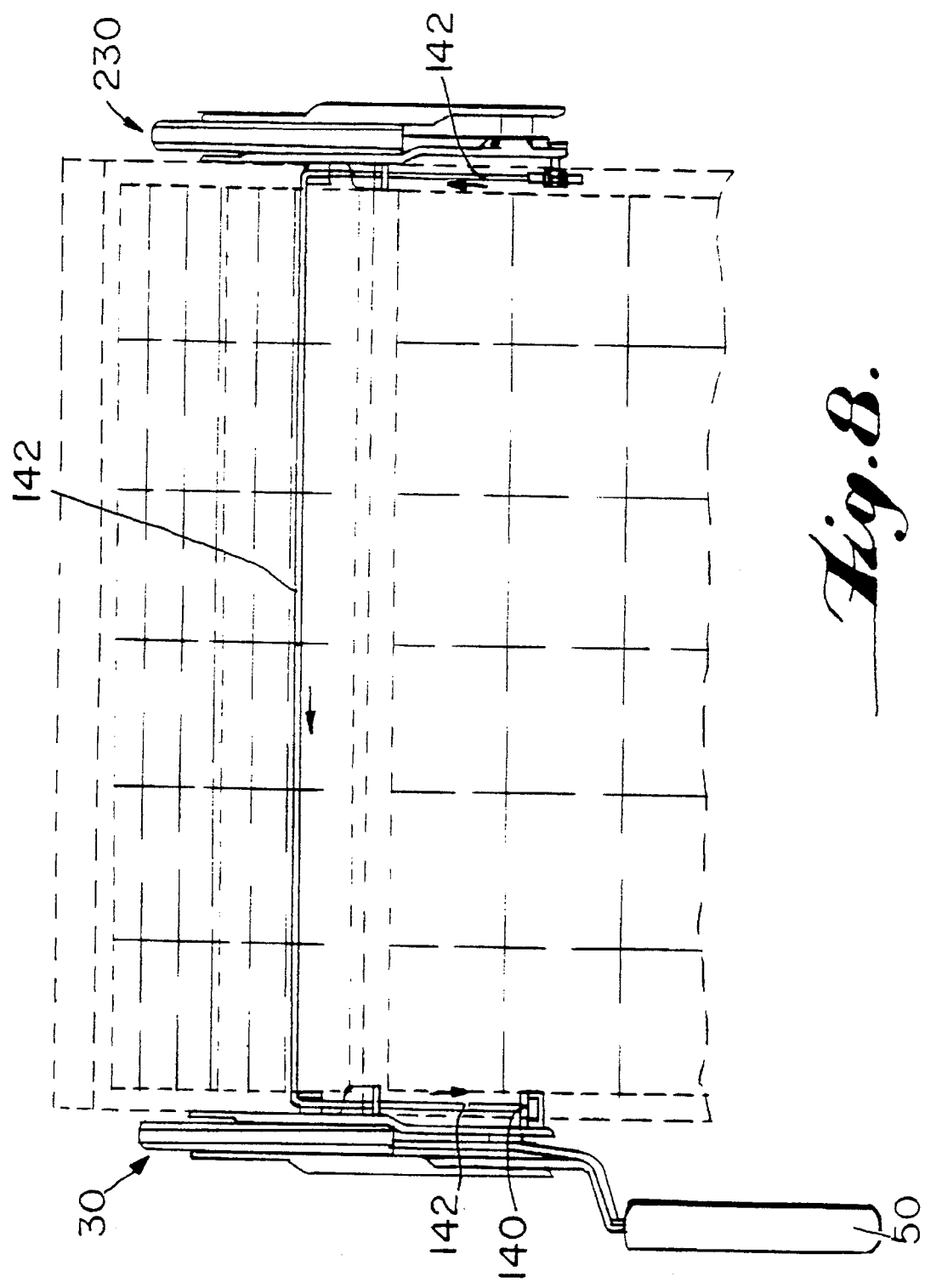

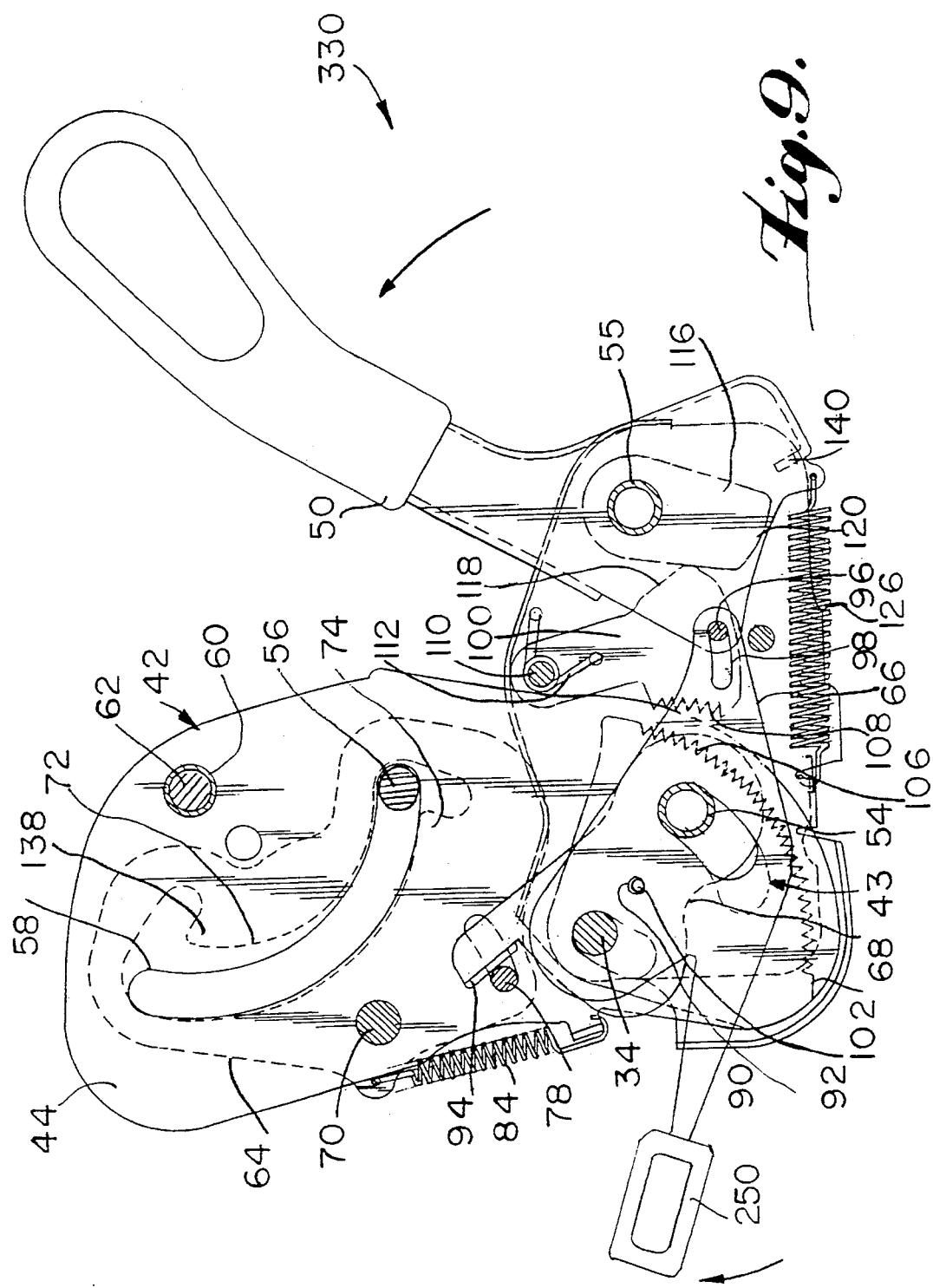

SEAT RECLINER

BACKGROUND OF THE INVENTION

The present invention relates to a connector structure utilized in a bench-type automobile seat assembly for connecting the lower portion of the seat back to a rearward portion of the seat.

It is known in the automotive industry to provide a bench-type vehicle seat assembly which is adapted to accommodate two or more persons. The conventional bench-type seat assembly includes a seat and a seat back which are connected to one another and retained in operative relation through a connector structure provided at opposite sides of the seat assembly. The normal inclined position which the seat back assumes with respect to the seat is termed the "dress-up" position. Some connector structures permit a seat assembly occupant to recline the seat back at varying angles with respect to the seat to enable the seat assembly occupant to position the seat back in positions other than the dress-up position in a manner which is most comfortable to the particular seat occupants. The connector structure enables such pivotal movement by providing a first pivot point about which the seat back can be pivoted with respect to the seat. The connector structure may further enable the seat back to be moved from its "dress-up" position to a "dump" position in which a back surface of the seat back provides a horizontal cargo support. This is accomplished by providing a second pivot point, which is higher that the first pivot point, that enables the seat back to be tilted forwardly (or "dumped") until its back surface is substantially horizontal.

In the conventional connector structure which has both the reclining and dumping features, at least two operating levers are provided; a first lever being used for reclining the seat back by enabling pivotal movement of the seat back about the first pivot point, and a second lever being used for enabling the seat back to be dumped by pivotal movement of the seat back about the second pivot point.

More recently, the patent literature has proposed to provide a connector structure that can accomplish both reclining and dump features, and which provides only one lever. For example, U.S. Pat. No. 4,629,252 discloses a bench-type connector structure which is capable of both the reclining and dump features, and which provides a single lever that is manually movable to permit the seat back to be pivotally moved about a first pivot point along incremental positions so that the seat back can be reclined at varying angles with respect to the seat. Although the connector structure in the aforementioned patent also permits the seat back to be dumped to provide a horizontal cargo support, movement of the lever does not effect the unlatching of a latch which enables the seat back to be moved into its dump position. Rather, after the lever is moved, limited forward movement of the seat back past the dress-up position is necessary to unlatch the connector structure to permit the seat back to be dumped. Thus, the device provides the seat back with an undesirably complicated range of movement.

Other problems with the aforementioned type of device also exist. For example, use of the lever in this type of device does not enable locking and unlocking of the seat back into and out of the dump position. In fact, the seat back cannot be locked in the dump position in any manner. This has the undesirable effect of providing an unstable cargo bed.

There is thus a need to provide a connector structure which overcomes the problems noted above. It is an object of the present invention to satisfy this need. In accordance with the principles of the present invention, there is provided a connector structure for connecting a rigid member disposed towards the lower portion of one side of an automobile seat back to a rearward portion of an automobile seat. The connector structure enables the seat back to be reclined at varying angles with respect to the automobile seat by being pivoted about a first pivot point. The connector structure further enables the seat back to be positioned in a manner which permits a back surface thereof to provide a horizontal cargo support by being pivoted about a second pivot point. The connector structure comprises a seat member adapted to be fixed to the seat, and an arm adapted to interconnect with the rigid member of the seat back. The arm is mounted on the seat member for movement along a plurality of incremental positions about the first pivot point to enable the seat back to be reclined at varying angles with respect to the seat. The arm has a releasable locking assembly constructed and arranged to lock the rigid member against movement relative to the arm to thereby rigidly maintain the seat back in one of (1) a dress-up position wherein the seat back is inclined at a predetermined angle with respect to the seat and (2) a dump position wherein the seat back is substantially parallel in overlying relation with respect to the seat and horizontally presents its back surface to provide a horizontal cargo support. The releasable locking assembly is releasable to permit movement of the rigid member of the seat back with respect to the arm about the second pivot point and thereby enable the seat back to be pivotally movable between the dress-up and dump positions. The connector structure also includes a latch assembly constructed and arranged to lock the arm selectively into one of the incremental positions so as to set the angle at which the seat back is reclined with respect to the seat at an angle greater than the predetermined angle. The connector structure also includes a lever mechanism manually movable to (1) disable the latch assembly and thereby permit the arm to be movable along the incremental positions about the first pivot point so that the seat back can be reclined at varying angles with respect to the seat and (2) release the releasable locking assembly to permit movement of the rigid member of the seat back with respect to the arm about the second pivot point and thereby enable the seat back to be pivotally movable between the dress-up and dump positions. The lever mechanism is manually releasable to selectively (1) enable the latch assembly to lock the arm into a selected one of the incremental positions so as to set the angle at which the seat back is reclined with respect to the seat and (2) enable the releasable locking assembly to lock the rigid member against movement relative to the arm and rigidly maintain seat back in one of the dress-up and dump positions.

It is a further object of the present invention to provide an entire seat assembly which overcomes the problems noted above. The present invention achieves this object by providing a seat assembly for an automobile comprising a seat, a seat back, and a pair of connector structures. The seat back has a pair of rigid members extending outwardly from lower portions of opposite sides of the seat back, and the pair of connector structures are disposed at opposite sides of the seat assembly. The connector structures are constructed and arranged to connect the lower portions of the seat back with a rearward portion of the seat and enable the seat back to be reclined at varying angles with respect to the automobile seat by being pivoted about a first pivot point and further enables the seat back to be positioned in a manner which permits a back surface thereof to provide horizontal cargo support by being pivoted about a second pivot point. At least one of the connector structures includes a seat member adapted to be fixed to the seat; an arm adapted to interconnect with the rigid member of the seat back and mounted on the seat member for movement along a plurality of incremental positions about the first pivot point to enable the seat back to be reclined at varying angles with respect to the seat, the arm having a releasable locking assembly constructed and arranged to lock the rigid member against movement relative to the arm to thereby rigidly maintain the seat back in one of (1) a dress-up position wherein the seat back is inclined at a predetermined angle with respect to the seat and (2) a dump position wherein the seat back is substantially parallel in overlying relation with respect to the seat and horizontally presents its back surface to provide a horizontal cargo support, the releasable locking assembly being releasable to permit movement of the rigid member of the seat back with respect to the arm about the second pivot point and thereby enable the seat back to be pivotally movable between the dress-up and dump positions; a latch assembly constructed and arranged to lock the arm selectively into one of the incremental positions so as to set the angle at which the seat back is reclined with respect to the seat at an angle greater than the predetermined angle; and a lever mechanism manually movable to (1) disable the latch assembly and thereby permit the arm to be movable along the incremental positions about the first pivot point so that the seat back can be reclined at varying angles with respect to the seat and (2) release the releasable locking assembly to permit movement of the rigid member of the seat back with respect to the arm about the second pivot point and thereby enable the seat back to be pivotally movable between the dress-up and dump positions; the lever mechanism being manually releasable to selectively (1) enable the latch assembly to lock the arm into a selected one of the incremental positions so as to set the angle at which the seat back is reclined with respect to the seat and (2) enable the releasable locking assembly to lock the rigid member against movement relative to the arm and rigidly maintain seat back in one of the dress-up and dump positions.

These and other objects of the present invention will become more apparent during the course of the following detailed description and appended claims,

DESCRIPTION OF THE DRAWINGS

FIG. 8 is a schematic top view showing a seat assembly incorporating a pair of connector structures manufactured in accordance with the present invention, with only one of the connector structures provided with a lever.

FIG. 9 is a diagrammatic side elevation showing the connector structure in accordance with the principles of the present invention, provided with two levers.

DESCRIPTION OF THE PREFERRED EMBODIMENT

Figure 1:
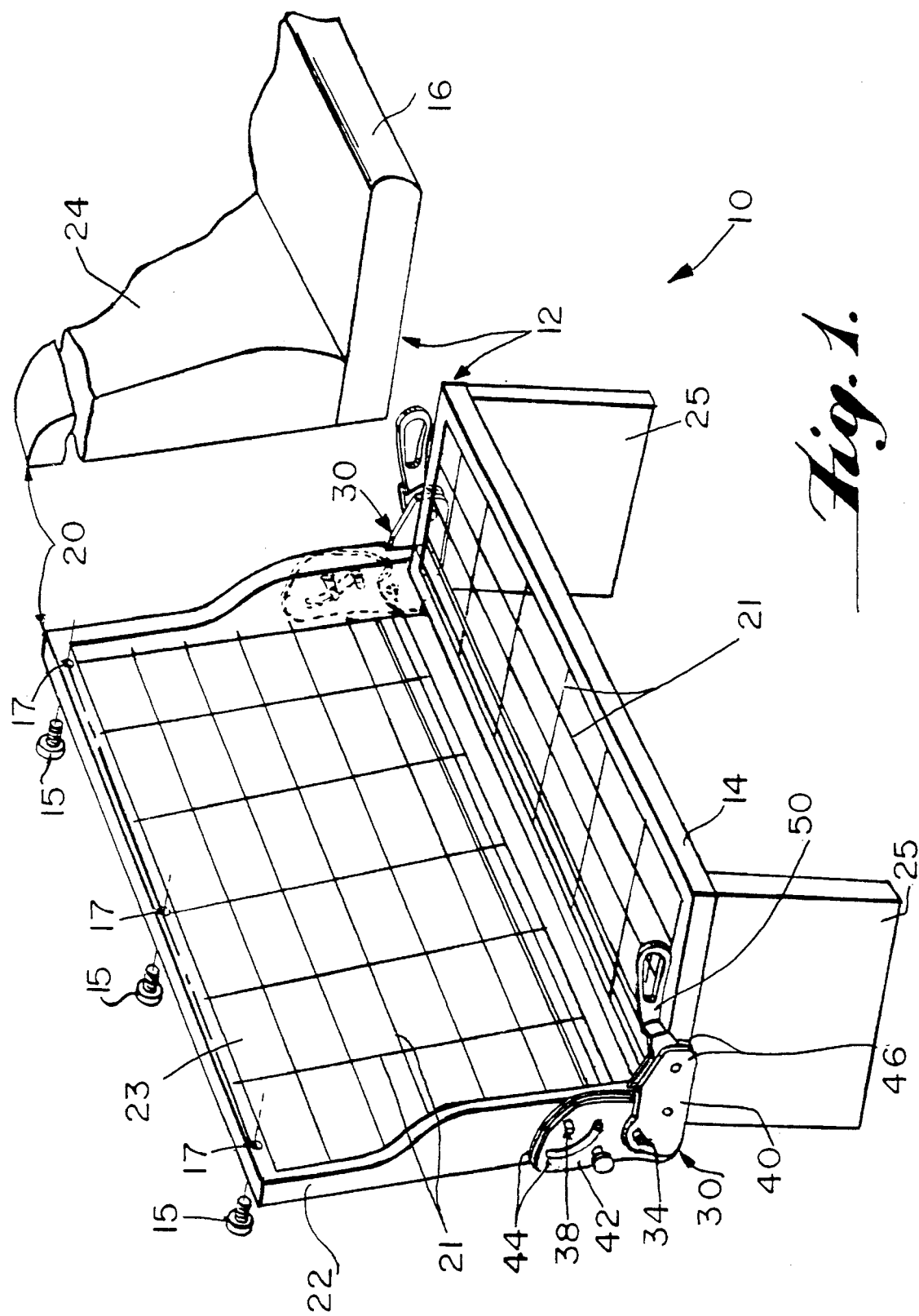
FIG. 1 is a perspective schematic view showing a seat assembly incorporating a pair of the connector structures in accordance with the principles of the present invention.

Shown generally in FIG. 1 is a seat assembly 10 utilizing a pair of connector structures 30 manufactured in accordance with the principles of the present invention. The seat assembly 10 includes a seat, generally indicated at 12. The seat 12 includes a seat frame 14 and a seat frame cushion 16. The seat assembly further includes a seat back, generally indicated at 20, which includes a seat back frame 22 and a seat back cushion 24. The cushion and frame members can be of any type. As shown, the frame members may be of an opened rectangular shape, with wire mesh 21 extending between the opposite sides of the frame for support. The seat back frame is preferably provided with a rigid back panel 23 (for example, behind wire mesh 21), and the seat frame 14 is preferably mounted on the vehicle floor on spaced risers 25. The seat back cushion 24 and seat cushion 16 are fastened to the seat back frame 22 and seat frame 14, respectively, in any appropriate manner. For example, fasteners 15 may be provided for extension through holes 17 in the seat back frame 22 for connection of the seat back frame 22 with the seat back cushion 24, as can be appreciated from FIG. 1.

The pair of connector structures 30 are disposed at opposite sides of the seat assembly 10 and connect the lower portions of the automobile seat back frame 22 to rearward portions of the seat frame 14. Operation of the connector structure enables the seat back to be reclined at varying angles with respect to the seat by being pivoted about a first pivot point, generally indicated at 34. The connector structure also enables the seat back to be positioned in a manner that permits the back surface thereof, (for example, as defined by the back of back panel 23) to provide a horizontal cargo support when the seat back is forwardly pivoted about a second pivot point 38.

As shown, the connector structure 30 includes a seat member 40 which is adapted to be fixed to the seat 12, and an arm 42 connected with the seat member 40 for movement along a plurality of incremental positions about the first pivot point. Rearward movement of the arm 42 will enable the seat back 20 to be reclined at varying angles with respect to the seat 12.

As can be appreciated from FIG. 1, the arm 42 includes a pair of spaced parallel plates 44. Similarly, seat member 40 includes a pair of parallel plates 46. The seat member plates 46 receive therebetween the plates 44 of the arm 42 as well as a portion of the lever 50, as shown.

Figure 2:
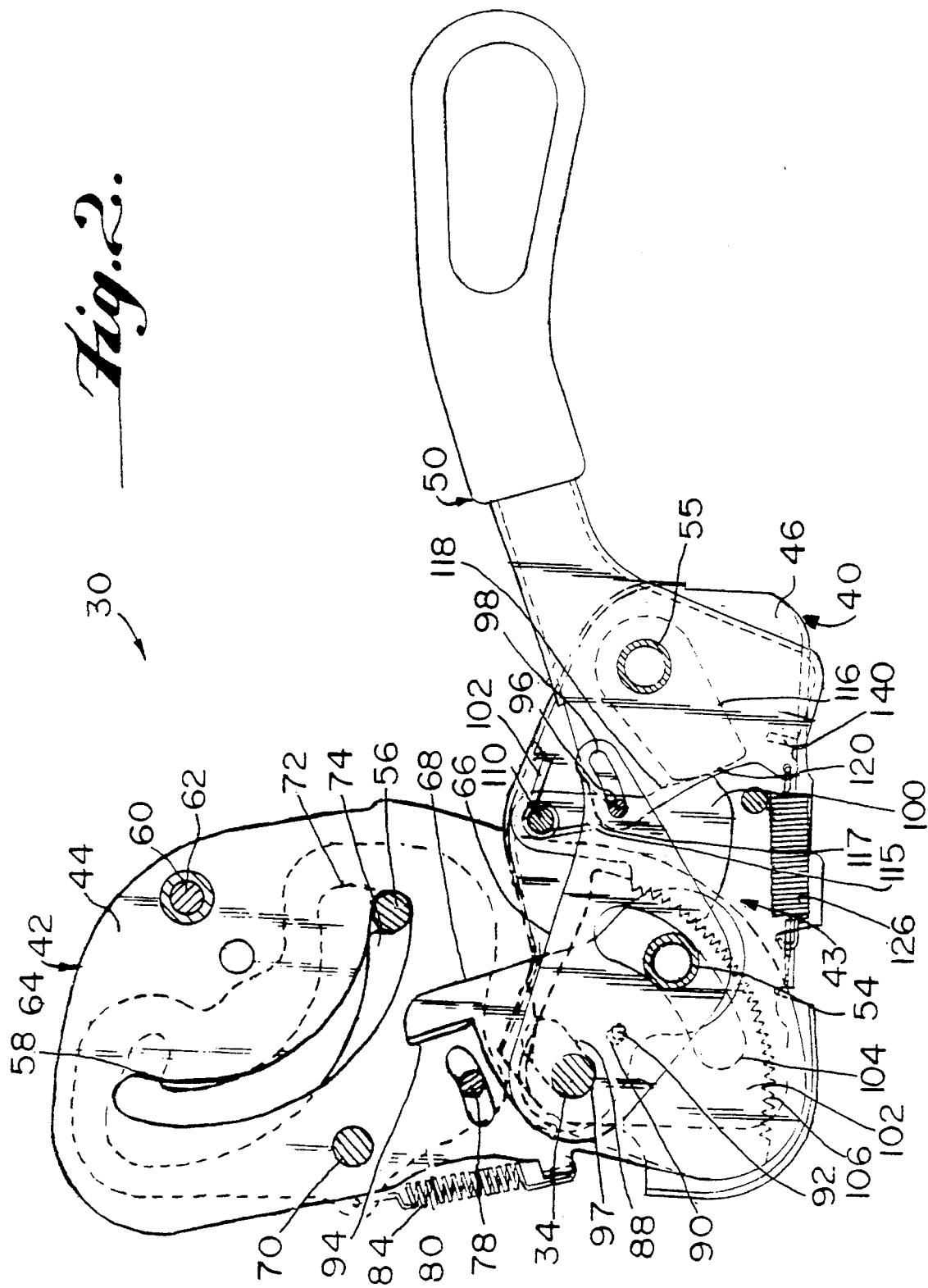
FIG. 2 is a diagrammatic side elevation illustrating the connector structure of the present invention in a condition it assumes when the seat back is in its dress-up position.

The connector structure 30 will now be described in greater detail with reference to FIG. 2. In FIG. 2, one of the seat member plates 46 is removed in order to show other portions of the connector structure 30 more clearly. As shown, the arm 42 is pivotally connected to the seat member 40 at first pivot point 34, which may be in the form of a rivet that extends laterally through the connector structure. Seat member 40 is adapted to be fixed to the automobile seat by being provided with a pair of rigid sleeve members 54 and 55, which extend through both plates 46. The rigid sleeve members can receive appropriate fasteners (not shown) that fix the seat member 40 to the seat frame 14.

Also shown in FIG. 2 is a rigid member 56, which forms part of the seat back 20, and is not part of the connector structure 30. Preferably, the rigid member 56 extends laterally outwardly from a lower side portion of the seat back frame 22, and is received in an arcuate slot 58 provided in the opposite plates 44 of arm 42. The arm 42 includes a rigid sleeve member 60 which extends through both arm plates 44, and defines a pivot point about which the seat back 20 can be pivoted between the dress-up and dump positions. More specifically, a rigid pin 62, similar to rigid member 56, extends laterally outwardly from the lower side of the seat back frame 22 and is received within rigid sleeve 60. In FIG. 2, the rigid member 56 is shown locked in a position within slot 58 that it assumes when the seat back is in its full dress-up position. As will be described later, when the seat back 20 is moved from its dress-up position to its dump position, rigid member 56 will be permitted to travel upwardly within slot 58 as the seat back pivots about pin 62.

The arm 42 comprises a releasable locking assembly generally indicated at 43, and including a locking member 64, a connecting member 66, and an engagement member 68. Each of the locking member 64, connecting member 66 and engagement member 68 have somewhat of a plate-like configuration. The locking member 64 is pivotally mounted between arm plates 44 by an appropriate pivot member 70. The locking member 64 is in the form of a single rigid plate, and has a zig-zag shaped slot 72 formed therein for receiving rigid member 56 of the seat back frame 22. As shown, the slot 72 in locking member 64 defines a stop portion 74 of locking member 64. The stop portion 74 normally locks rigid member 56 in place within slot 58 of the arm 42 when the seat back assumes its dress-up position. The locking member 64 includes a pin member 78, which extends laterally outwardly from the main plate-like portion of locking member 64 and is received within a slot 80 formed in the plate 44 visible in FIG. 2. Pivotable movement of the locking member 64 about pivot member 70 causes pin member 78 to move within slot 80. As can be appreciated from FIG. 2, the locking member 64 is normally biased into its farthermost counter-clockwise position (as limited by the engagement of rigid member 56 with the lower end of slot 72) by the biasing force of spring member 84, which is connected between the locking member 64 and a lower portion of arm 42.

The engagement member 68 is disposed between seat member plates 46 on one side of the arm 42 as shown. The engagement member 68 is pivotally mounted for movement on the seat member 40 about rigid sleeve member 54, and has an engagement portion 94 which is adapted to engage pin member 78 when the engagement member 68 is pivoted about rigid sleeve member 54 in a counter-clockwise direction. The range of movement of the engagement member 68 is defined by a slot 88 provided therein for receiving rivet 34. More specifically, pivotable movement of engagement member 68 about rigid sleeve member 54 is limited by the opposite ends of slot 88 coming into engagement with the pivot member 34.

Movement of engagement member 68 is primarily governed by movement of connecting member 66. More specifically, engagement member 68 is provided with an opening 90 therethrough, which receives a pin member 92 laterally extending from the main plate-like portion of connecting member 66. Movement of the engagement member 66 causes the pin member 92 thereof to engage the edges defining opening 90 within the engagement member 68 to cause movement of the engagement member.

Connecting member 66 has a circular opening 97 therethrough for receiving the pivot member 34, and for enabling the connecting member 66 to be pivotable about the pivot member 34. Movement of connecting member 66 is primarily governed by movement of lever 50. More specifically, lever 50 is provided with a laterally extending pin member 96, which extends through a slightly arcuate opening 98 within connecting member 66. More specifically, movement of lever 50 causes pin member 96 to be slidingly forced against the lower edge defining the opening 98 within connecting member 66 to cause clockwise pivotal movement of the connecting member 66 about pivot member 34 in FIG. 2.

Arm 42 is normally prevented from pivoting about pivot member 34 due to its being latched in place by latch member 100. More specifically, a teeth plate 102 is rigidly fixed between arm plates 44. Teeth plate 102 has a circular opening (i.e., aligned with opening 97 in connecting member 66) for receiving pivot member 34 therethrough, an arcuate groove 104 therethrough which is aligned with similar grooves in each arm plate 44 to which the teeth plate is fixed, and peripheral teeth 106. Latch member 100 is provided with teeth 108, which engage teeth 106 to effectively latch arm 42 in place.

Latch member 100 is pivotally mounted to one of the seat member plates 46 by an appropriate fixed pivot 110. A spring member 112 is connected at one end 113 thereof to one of the seat plates 46, is coiled around pivot member 110, and is connected at an opposite end 115 thereof to latch member 100 through an opening 117 therein. The spring member 112 applies a biasing force which tends to pull the latch member 100 in a direction away from teeth plate 102 so that the teeth 108 of the latch member are brought out of engagement with the teeth 106 of the teeth plate. In its position shown in FIG. 2, however, latch member 100 has its teeth in latching engagement with teeth 106 of the teeth plate due to the spring opposing force of stop plate 116 rigidly fixed to the lever 50. More specifically, latch member 100 is a plate-like member having an edge 118 opposite the edge thereof forming teeth 108. Similarly, stop member 116 has a leading edge 120 which is constructed to engage edge 118. This engagement prevents latch 100 from moving out of latching engagement with teeth plate 102 when the lever 50 is in its normally biased position.

Lever 50 is pivotally mounted between seat member plates 46 about rigid sleeve member 55, and maintains its normally biased position through the biasing force of spring member 126, which connects a portion of lever 50 to a spaced portion of one of the seat plates 46.

Figure 3:
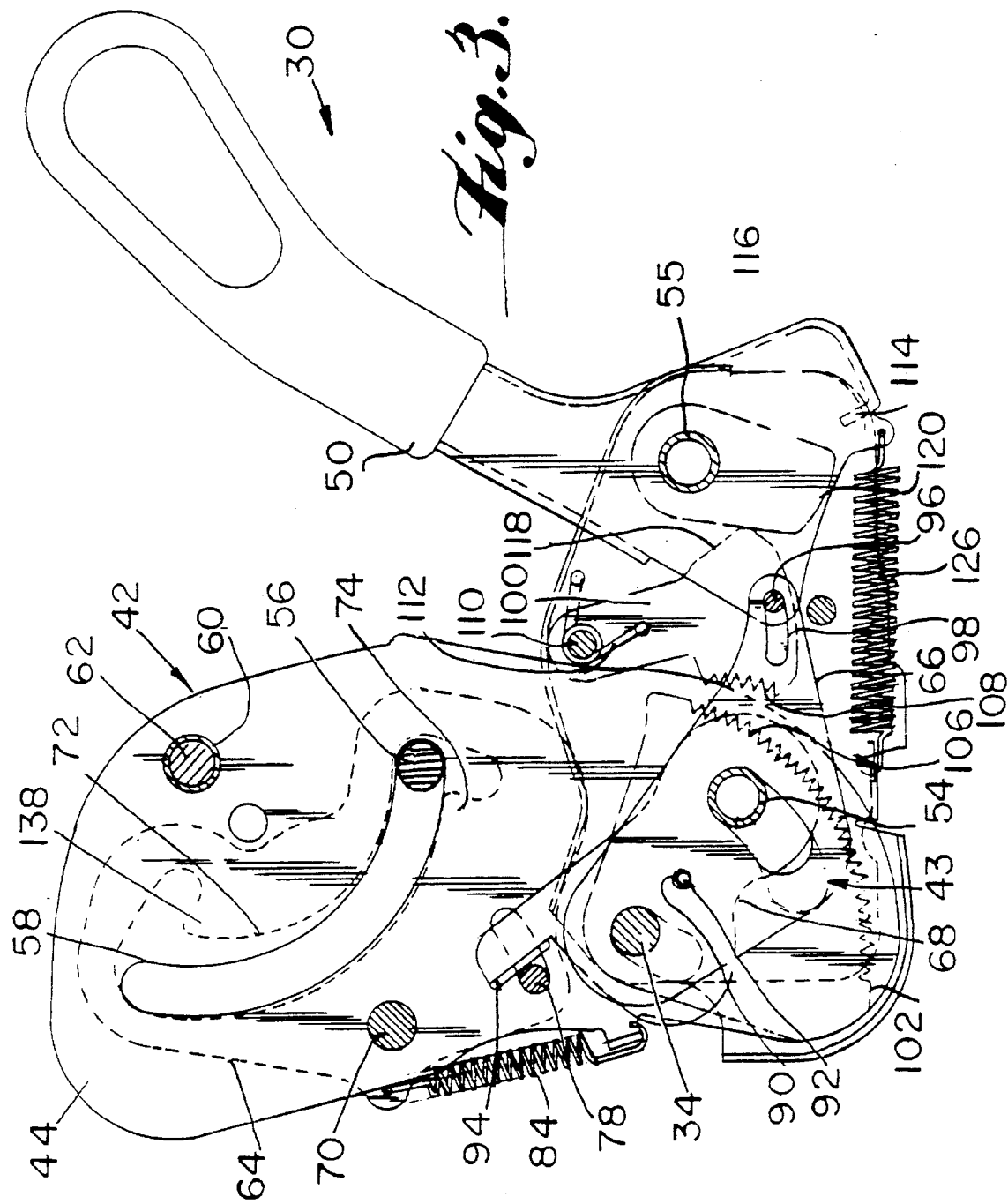
FIG. 3 is a diagrammatic side elevation illustrating the connector structure of the present invention in an un-latched condition.

The operation of the connector structure of the present invention will now be described with reference to FIGS. 3-7. As previously mentioned, FIG. 2 shows the connector structure 30 in a latched condition with the seat back in its dress-up position. FIG. 3 shows the connector structure in an unlatched condition. As shown, lever 50 has been moved, for example, by manual engagement, in a counter-clockwise direction about rigid sleeve member 55. This movement of lever 50 is performed against the biasing force of spring member 126, shown in a stretched condition in FIG. 3. Movement of lever 50 in this manner causing the leading edge 120 of the rigid stop member 116 (which is preferably welded to lever 50) to move out of engagement with the edge 118 of latch member 100. Such disengagement enables latch member 100 to be pivotally moved through the biasing force of spring member 112 in a counter-clockwise direction (as seen in FIG. 3) about pivot member 110. As latch member 100 is moved in such fashion, the teeth 108 thereof are disengaged from teeth 106 of teeth plate 102.

Figure 4:
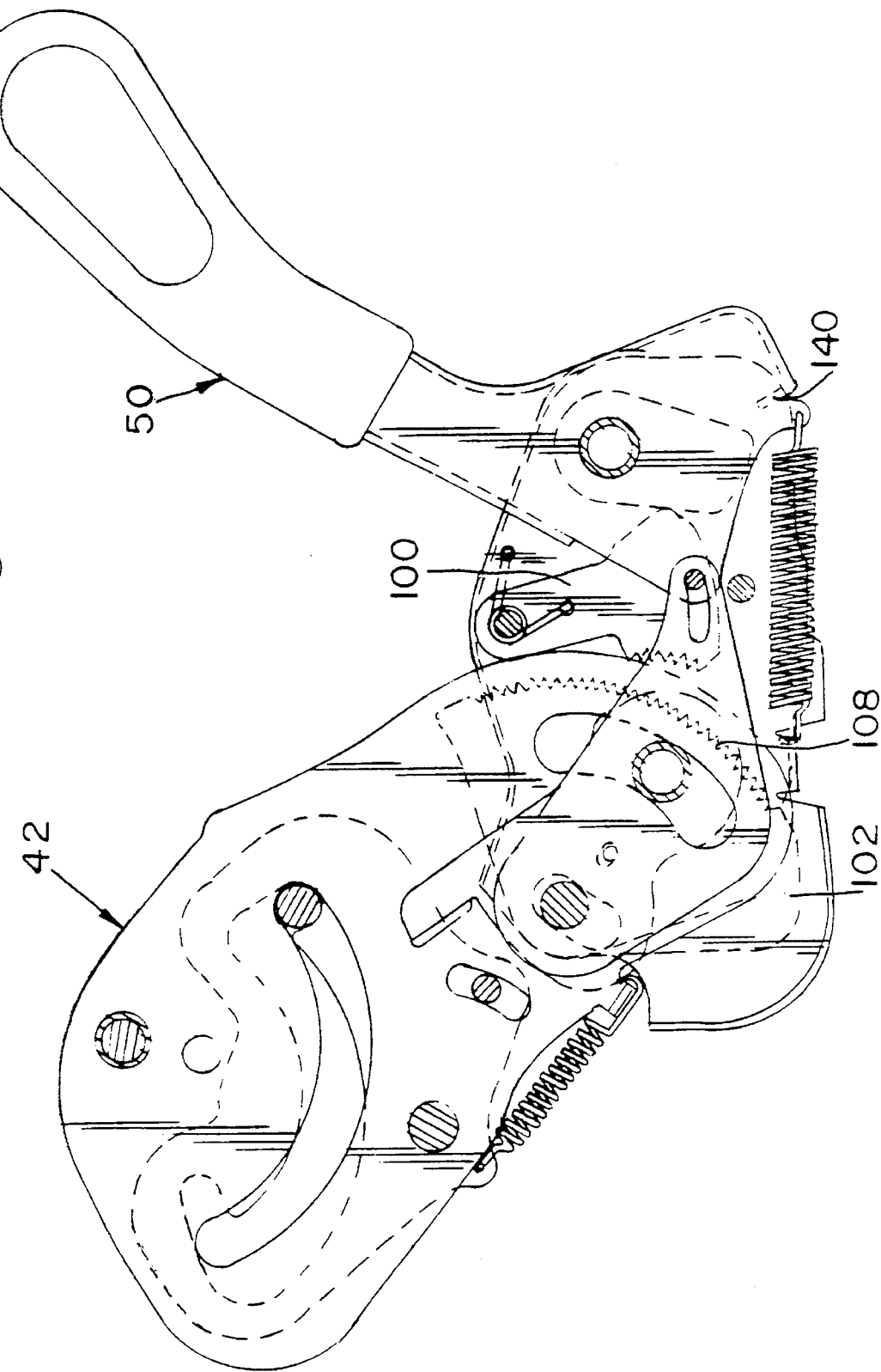
FIG. 4 is a diagrammatic side elevation illustrating the connector structure of the present invention in a condition it assumes when it is in an unlatched condition, with the seat back in a reclined position.
Figure 7:
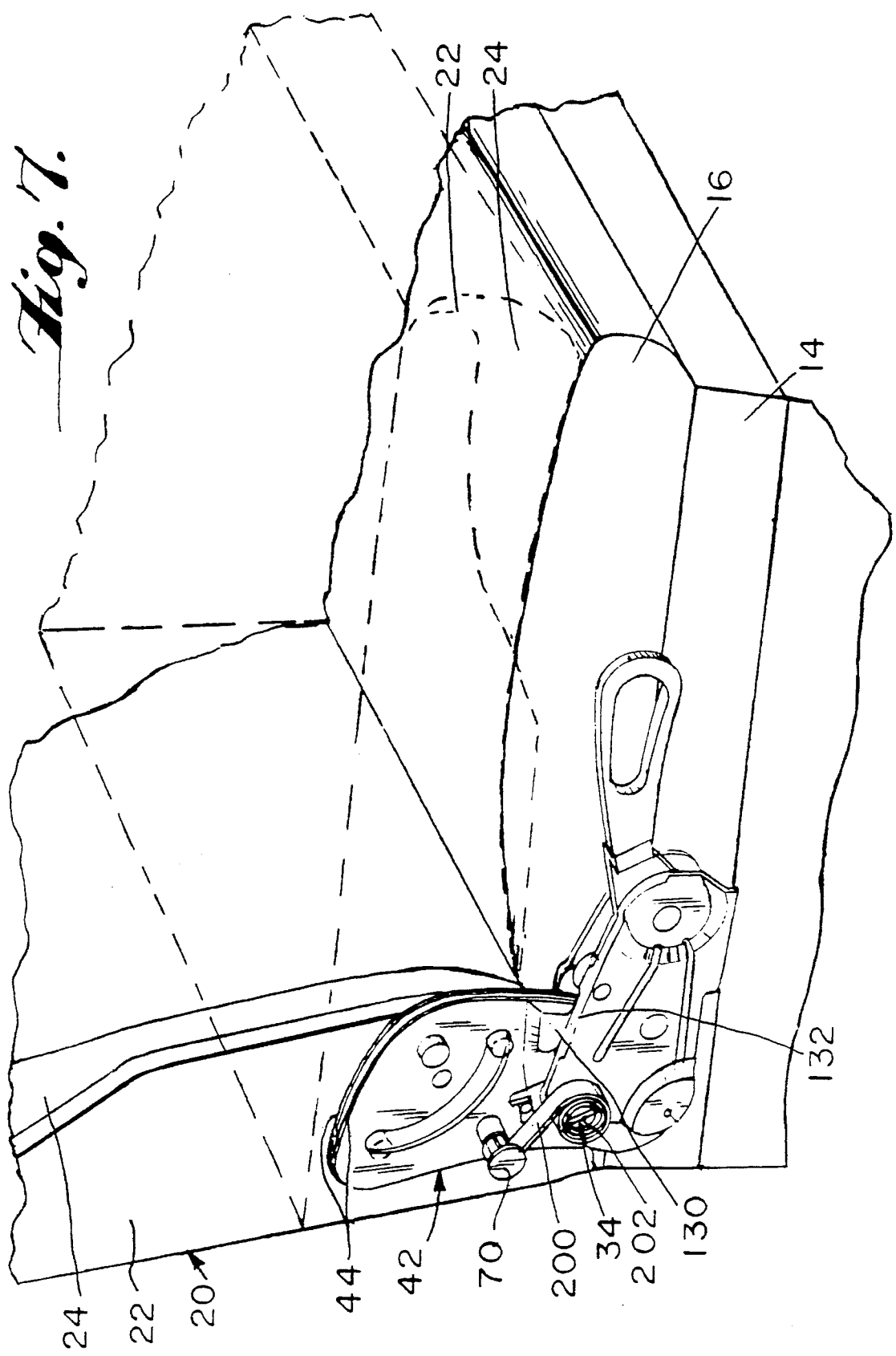
FIG. 7 is a perspective view showing the connector structure of the present invention connected between a seat back and a seat, with the seat back shown in the dress-up position in solid lines and in the dump position in dashed lines.

Disengagement of teeth 108 from teeth 106 enables the arm 42 to be pivotally movable about the pivot member 34 in a counter-clockwise direction from its position in FIG. 3 to its position in FIG. 4. This movement can be accomplished by a seat occupant simply exerting a rearward force by leaning backwards against the seat back to move the seat back from its dress-up position to a reclined position against the forwardly biasing force of a coiled counter-balance spring 200, as shown in FIG. 7. Spring 200 has one end thereof disposed in a slot 202 provided in one end of pivot member 34, as shown. The spring 200 is then coiled about the pivot member 34 and has an opposite end thereof in biasing engagement with a portion of pivot member 70. The engagement of spring 200 with pivot member 70 biases the arm 42 and, hence, the entire seat back for forward pivotal movement about pivot member 34. As can also be appreciated from FIG. 7, the dress-up position is the forwardmost position that the arm 42 will assume with respect to the seat. Particularly, a rigid stop 130 provided with the arm prevents clockwise movement thereof about the pivot member 34 past the dress-up position. Such a stop feature may be accomplished simply by providing the arm plates 44 with an increased thickness at strategic portions thereof as shown. The rigid stop 130 engages the upper edge 132 of seat member plates 46 to prevent further movement of the arm 42 in the forward direction with respect to the seat member 40.

As shown in FIG. 4, arm 42 has been inclined at an angle greater than the predetermined angle at which it and the seat back assume when the seat back is in the dress-up position. When the lever 50 is then manually released by the occupant, the latch member 100 is permitted to return to its original position to engage teeth 108 of teeth plate 102 to thereby lock the arm into any selected one of the incremental positions defined by teeth 108. This will set the angle at which the seat back is reclined with respect to the seat. This can be clearly appreciated from FIG. 5, where the arm 42 is shown in a condition that will lock the seat back in a reclined position with respect to the seat.

Figure 5:
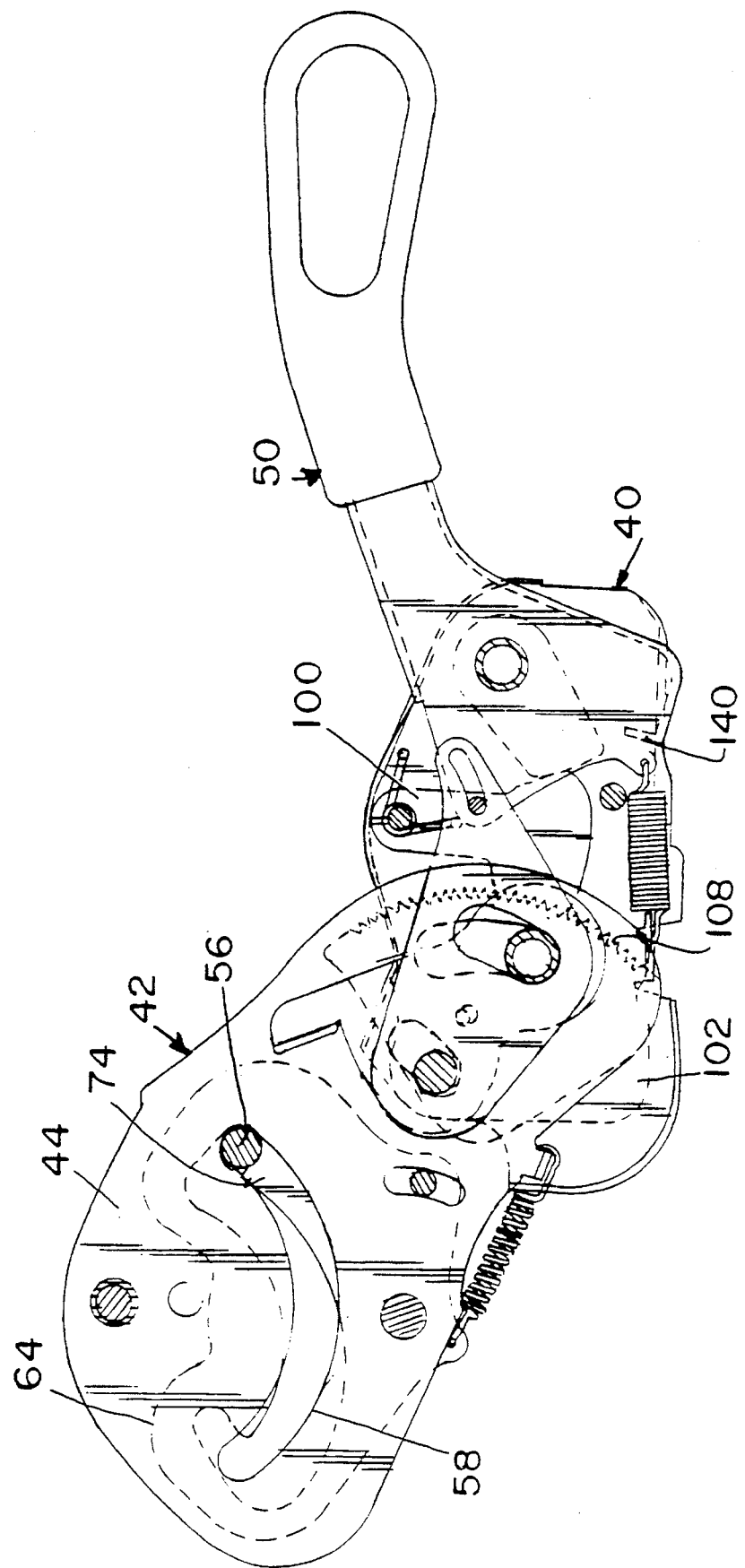
FIG. 5 is a diagrammatic side elevation illustrating the connector structure of the present invention in a condition it assumes when it is in a latched condition, with the seat back in a reclined position.

When the seat back is to be returned from its reclined position to the dress-up position, the seat occupant engages lever 50 in FIG. 5 and moves it in a counter-clockwise direction so that the latch member 100 disengages from the teeth 108, and leans forwardly away from the seat back to remove his or her weight from the seat back and enable the biasing force of spring 200 to return the seat back to the dress-up position.

Referring back to FIG. 3, it can be appreciated that when lever 50 is moved into the position shown, the seat back 20 can be selectively reclined, as explained above, or alternatively, dumped as will now be described. More specifically, movement of lever 50 into the position shown causes the releasable locking assembly 43 to be released so as to permit movement of rigid member 56 of the seat back relative to the arm 42 to enable the seat back to be pivotally moveable between the dress-up and dump positions. That is, when lever 50 is moved into the position shown in FIG. 3, its operative connection with the connecting member 66 via the extension of pin member 96 into opening 98 causes the connecting member 66 to be pivotally moved in a clockwise direction about pivot member 34. With such movement, the connecting member 66 in turn moves engagement member 68 in a counter-clockwise direction about rigid sleeve member 54 through the engagement of pin member 92 of the connecting member with the edge defining opening 90 in the engagement member 68. The engagement portion 94 of the engagement member 68 is thus moved into engagement with the pin member 78 of locking member 64. This causes pivotable rotation of locking member 64 in a clockwise direction about pivot member 70 in FIG. 3. Movement of the locking member 64 in such fashion causes slot 58 in arm plates 44 to become aligned with the slot 72 within locking member 64 so that rigid member 56 is free to move along the aligned slots. More specifically, when locking member 64 is moved as a result of the engagement between the engagement portion 94 of engagement member 68 with the pin member 78, the stop portion 74 of locking member 64 is moved so that it no longer interferes with the ability of rigid member 56 to move within slot 58. An individual may then grasp the seat back and pivot it about rigid pin 62 to fold it into the dump position in overlying relation with respect to the seat to provide a horizontal cargo support. The dump position is represented by the dashed line portion of FIG. 7.

Figure 6:
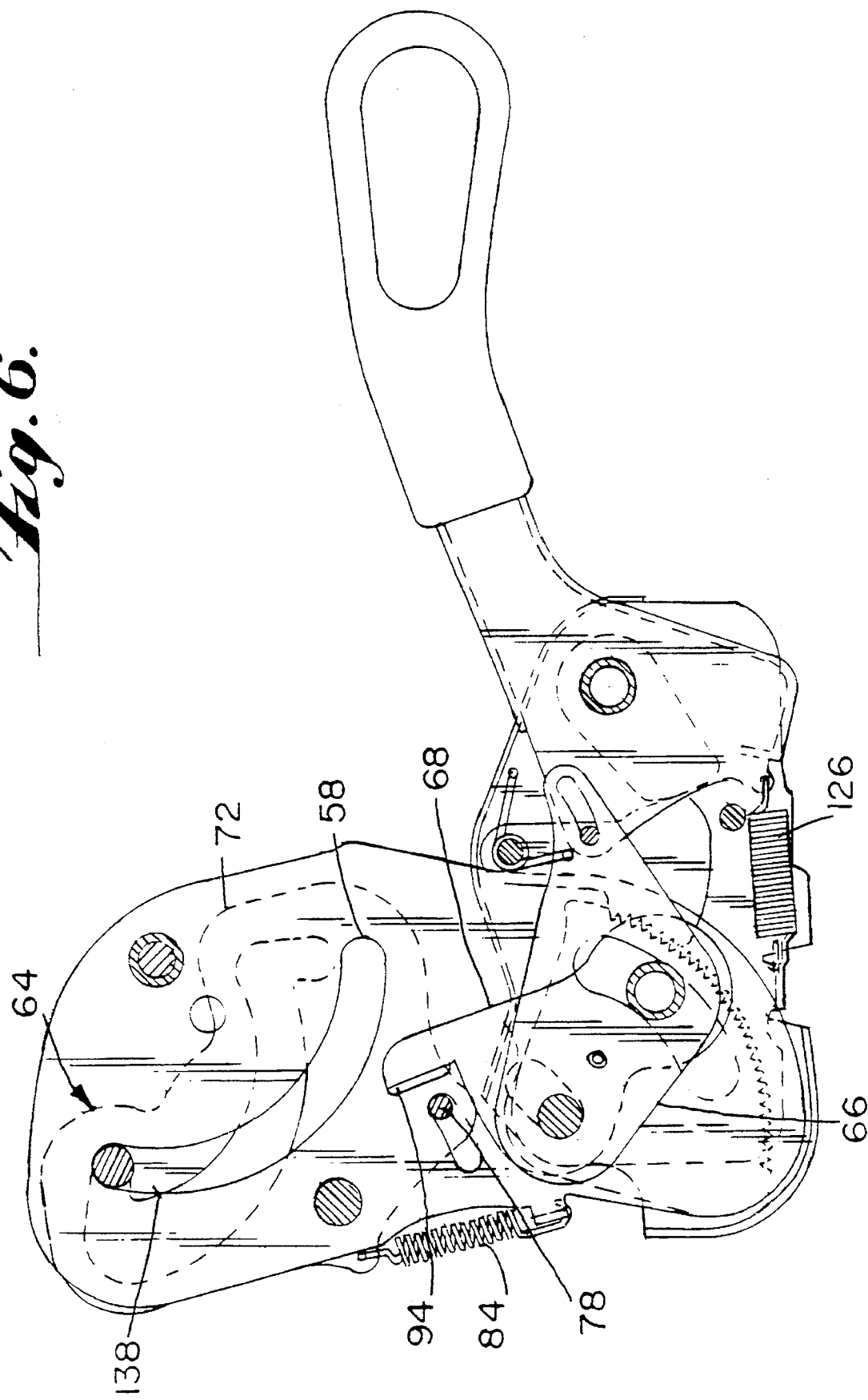
FIG. 6 is a diagrammatic side elevation illustrating the connector structure of the present invention in a condition it assumes when the seat back is in a dumped position.

When the seat back is manually moved into overlying relation with the seat so as to provide a horizontal cargo support, the rigid member 56 rides up the slots 58 and 72 to the position shown in FIG. 6. When lever 50 is then released, it is spring biased into its initial position via spring 126, and connecting member 66 and engagement member 68 are rotated in directions opposite to that in which they are rotated when manual lever 50 is moved. As a result, the engagement portion 94 is moved away from pin member 78, and the force of biasing spring member 84 causes counter-clockwise rotation of locking member 64, as can be appreciated from FIG. 6. Such rotation of locking member 64 causes the slots 72 and 58 to come out of alignment, and also causes stop portion 138 of locking member 64 to lock rigid member 56 in place. As a result, the seat back will be rigidly locked in the dump position to provide a sturdy horizontal cargo support.

It can be appreciated that lever 50 need not be continuously manually engaged when the seat back is being moved from its dress-up to its dump position. More specifically, once rigid member 56 rides partially up through groove 58, the lever 50 may be released to return to its original position. Rigid member 56 will continue to be free to ride within groove 58 until it reaches either end of grooves 58. More specifically, when rigid member 56 reaches the upper end of groove 58, stop portion 138 will be biased to slip behind the rigid member 56 via the biasing force of spring 84 on locking member 64 to lock the seat back in the dump position as shown in FIG. 6. On the other hand, if the rigid member 56 first reaches the lower end of groove 58, stop portion 74 will be biased to slip behind the rigid member 56 via the biasing force of spring 84 on locking member 64 to lock the seat back in the dress-up position as shown in FIG. 2.

From FIGS. 3 and 4, it can be appreciated that rearward movement of the arm 42 to effectuate reclining of the seat back will cause engagement portion 94 to disengage from pin 78 so that rigid member 56 remains locked at the lower end of groove 58 by stop portion 74. This prevents the undesirable possibility of the seat back being dumped while it is reclined.

From FIG. 7, it can be appreciated that there is a certain degree of compression between seat cushion 16 and seat back cushion 24 when the seat back is locked in the dump position. This provides for an advantageously sturdy horizontal cargo support.

While it can be appreciated that each connector structure 30 at opposite sides of seat assembly 10 may be provided with its own lever 50 as shown in FIG. 1, only one of the connector structures need be provided with such a lever, since operation of either lever 50 in FIG. 1 effectively causes the same operation in both connector structures 30 by use of a conventional Bowden cable assembly. More specifically, as shown in FIG. 8, a Bowden cable 142 extends from a portion 140 of lever 50 to an opposite connector structure 230 (without lever 50). Movement of lever 30 will cause movement of the cable 142 (in the direction indicated by arrows) to cause similar movement in both connector structures. The opposite connector structure 230 may be identical to connector structure in all respects, except for having lever 50 being cut off, and movement of a stop member 116 effectuated by movement or tensioning of cable 142. It can also be appreciated that the present invention contemplates providing only one connector structure, at one side of the seat assembly 10, with the opposite side provided with a simple connection between the seat and seat back that permits pivotal movement about two pivot points (i.e., one pivot point for reclining and another for dumping).

Finally, FIG. 9 shows another embodiment of the connector structure in accordance with the principles of the present invention. The connector structure 330 of this embodiment is identical to that of the first embodiment, except for the provision of a second, additional lever 250. The second lever 250 is integrally formed as part of the connecting member 66. It can be appreciated from FIG. 9 that upward movement of lever 250 effectuates the same function as movement of lever 50. Thus, all of the desired functions can be accomplished with use of either one of the two levers. However, operation of both levers is never required. Provision of a second lever may be desirable if there is a need to access the connector structure 30 from more than one convenient location. For example, if the back-seat is the rearwardmost seat of a van-type vehicle it may be desirable to dump the seat back from behind the vehicle through the vehicle rear doors.

It thus will be seen that the objects of this invention have been fully and effectively accomplished. It will be understood, however, that the foregoing preferred specific embodiments have been shown and described for the purpose of this invention and is subject to change without departure from such principles. Therefore, this invention includes all modifications encompassed within the spirit and scope of the following claims.

What is claimed is:

1. A connector structure for connecting a rigid member disposed towards the lower portion of one side of an automobile seat back to a rearward portion of an automobile seat and enabling said seat back to be reclined at varying angles with respect to the automobile seat by being pivoted about a first pivot point and further enabling said seat back to be positioned in a manner which permits a back surface thereof to provide horizontal cargo support by being pivoted about a second pivot point, said connector structure comprising:

a seat member adapted to be fixed to the automobile seat;

an arm pivotally mounted on said seat member and constructed and arranged in a manner which permits it to cooperatively engage the rigid member of the seat back, said arm being pivotably movable along a plurality of incremental positions about said first pivot point to enable said seat back to be reclined at varying angles with respect to said seat, said arm having a releasable locking assembly constructed and arranged to lock said rigid member against movement relative to said arm to thereby rigidly maintain said seat back in one of (1) a dress-up position wherein said seat back is inclined at a predetermined angle with respect to said seat and (2) a dump position wherein said seat back is disposed in substantially parallel overlying relation with respect to said seat and horizontally presents its back surface to provide a horizontal cargo support, said releasable locking assembly being releasable to permit movement of the rigid member of said seat back with respect to said arm about said second pivot point and thereby enable said seat back to be pivotally movable between said dress-up and dump positions;

a latch assembly constructed and arranged to lock said arm selectively into one of said incremental positions so as to set the angle at which said seat back is reclined with respect to said seat at an angle greater than said predetermined angle; and a lever mechanism manually movable to (1) disable said latch assembly and thereby permit said arm to be movable along said incremental positions about said first pivot point so that said seat back can be reclined at varying angles with respect to said seat and (2) release said releasable locking assembly to permit movement of said rigid member of said seat back with respect to said arm about said second pivot point and thereby enable said seat back to be pivotally movable between said dress-up and dump positions;

said lever mechanism being manually releasable to selectively (1) enable said latch assembly to lock said arm into a selected one of said incremental positions so as to set the angle at which said seat back is reclined with respect to said seat and (2) enable said releasable locking assembly to lock said rigid member of said seat back against movement relative to said arm so as to rigidly maintain said seat back in one of said dress-up and dump positions.

2. A connector structure according to claim 1, wherein said latch assembly includes a pivotable latch member for lockingly engaging said arm against movement in one of said incremental positions, said latch member being movable out of locking engagement with said arm to permit said arm to be moved along said plurality of incremental positions about said first pivot point when said lever mechanism is manually moved so as to be pivoted about a third pivot point against a biasing force provided by a spring member.

3. A connector structure according to claim 2, wherein said lever mechanism includes a stop member constructed and arranged to maintain said latch member in said locking engagement with said arm against an external force applied to said arm when a seat occupant applies rearward reclining force against the seat back.

4. A connector structure according to claim 3, wherein said arm includes a slot adapted to receive said rigid member of said seat back, and wherein said releasable locking assembly includes a locking member constructed and arranged to rigidly maintain said rigid member in a first position within said slot when said seat back is in said dress-up position so as to rigidly maintain said seat back in said dress-up position, and in a second position within said slot when said seat back is in said dump position so as to rigidly maintain said seat back in said dump position.

5. A connector structure according to claim 4, wherein said locking member includes a slot cooperative with said slot in said arm, said locking member being movable relative to said arm to enable said slot in said locking member to capture said rigid member selectively in one of said two positions in the slot in said arm, said locking member being constructed and arranged so that when said releasable locking assembly is released the slots in said locking member and in said arm are aligned in such fashion so as to permit movement of said rigid member between said two positions and to permit said seat back to be moved between said dress-up and dump positions.

6. A connector structure according to claim 5, wherein said locking member is pivotable about a fourth pivot point and includes a pin member which normally assumes a primary position relative to said arm when said seat back is in said dress-up position, said pin member being movable from said primary position to said secondary position when said seat back is in said dress-up position to pivotally move said locking member about said fourth pivot point against the force of a biasing spring member so that the slots in said locking member and in said arm are aligned to permit said movement of the rigid member between said two positions and to permit the seat back to be moved between said dress-up and dump positions when said lever mechanism is manually pivoted about said third pivot point against the biasing force of said spring member, said releasable locking assembly further including an engagement member constructed and arranged to move said pin member from said primary position to said secondary position when said lever mechanism is manually pivoted about said third pivot point against the biasing force of said spring member.

7. A connector structure according to claim 6, further comprising a connecting member operatively connecting said lever mechanism with said engagement member so that said engagement member is moved to move said pin member from said primary position to said secondary position when said lever is manually pivoted about said third pivot point against the biasing force of said spring member.

8. A connector structure according to claim 7, wherein manual movement of said lever mechanism about said third pivot point against the biasing force of said spring member when said seat back is in said dress-up position simultaneously causes i) said latch member to be moved out of locking engagement with said arm to permit said arm to be moved along said plurality of incremental positions about said first pivot point, and ii) said locking member to be moved about said fourth pivot point against the force of the biasing spring member so that the slots in said locking member and in said arm are aligned to permit said movement of the rigid member between said two positions and to permit the seat back to be moved between said dress-up and dump positions, wherein manual movement of said lever mechanism about said third pivot point against the biasing force of said spring member when said seat back is in said dress-up position enables said connector structure to permit said seat back to be selectively
i) moved about said second pivot point to decrease the angle said seat back forms with said seat until said seat back assumes said dump position in which said seat back provides a horizontal cargo support, and
ii) moved about said first pivot point to increase angle said seat back forms with said seat along a plurality of incremental positions to enable said seat back to be reclined at an angle greater than an angle at which said seat back is reclined with respect to said seat when said seat back is in said dress-up position.

9. A connector structure according to claim 8, wherein when said lever mechanism is released the biasing force provided by said spring member causes movement of said lever mechanism in an opposite direction to the direction in which it is manually moved, said movement of said lever mechanism in said opposite direction causing said connecting member to move said engagement member in a manner that returns said pin member from said secondary position to said primary position so that the locking member is pivotally moved from the force of the biasing spring member so that the slots in the locking member and in the arm are brought out of alignment to lock the rigid member in place in either of the dress-up and dump positions.

10. A connector structure according to claim 9, wherein said latch member comprises a plurality of ratchet teeth engageable with matching ratchet teeth connected with said arm to enable said latch member to lockingly engage said arm against movement, said ratchet teeth of said latch member being movable out of locking engagement with said matching ratchet teeth connected with said arm to permit said arm to be moved along said plurality of incremental positions about said first pivot point.

11. A connector structure according to claim 10, wherein pivotal movement of said arm movement to an incremental position at which the seat back is reclined at said angle greater than said predetermined angle causes said pin of said locking member to be moved away from said engagement member so that said pin is disengaged from said engagement member and returns to said primary position to enable said locking member to be pivotally moved about said fourth pivot point from the force of the biasing spring member so that the slots in said locking member and in said arm are moved out of alignment to lock the rigid member in place so as to prevent the seat back from being moved relative to said arm when said seat back is reclined.

12. A connector structure according to claim 11, further comprising a manually engageable second lever mechanism movable to (1) disable said latch assembly and thereby permit said arm to be movable along said incremental positions about said first pivot point so that said seat back can be reclined at varying angles with respect to said seat and (2) release said releasable locking assembly to permit movement of said rigid member of said seat back with respect to said arm about said second pivot point and thereby enable said seat back to be pivotally movable between said dress-up and dump positions;

said second lever mechanism being manually releasable to selectively (1) enable said latch assembly to lock said arm into a selected one of said incremental positions so as to set the angle at which said seat back is reclined with respect to said seat and (2) enable said releasable locking assembly to lock said rigid member against movement relative to said arm and rigidly maintain seat back in one of said dress-up and dump positions.

13. A connector structure according to claim 12, wherein said manually engageable second lever is integrally formed with said connecting member.

14. A connector structure according to claim 1, further comprising a manually engageable second lever mechanism movable to (1) disable said latch assembly and thereby permit said arm to be movable along said incremental positions about said first pivot point so that said seat back can be reclined at varying angles with respect to said seat and (2) release said releasable locking assembly to permit movement of said rigid member of said seat back with respect to said arm about said second pivot point and thereby enable said seat back to be pivotally movable between said dress-up and dump positions;

said second lever mechanism being manually releasable to selectively (1) enable said latch assembly to lock said arm into a selected one of said incremental positions so as to set the angle at which said seat back is reclined with respect to said seat and (2) enable said releasable locking assembly to lock said rigid member of said seat back against movement relative to said arm so as to rigidly maintain said seat back in one of said dress-up and dump positions.

15. A seat assembly for an automobile comprising:

a seat;

a seat back having a pair of rigid members extending outwardly from lower portions of opposite sides of said seat back; and a pair of connector structures each disposed at opposite sides of said seat assembly constructed and arranged to connect the lower portions of said seat back with a rearward portion of said seat, said connector structures enabling said seat back to be reclined at varying angles with respect to the automobile seat by being pivoted about a first pivot point and further enabling said seat back to be positioned in a manner which permits a back surface thereof to provide horizontal cargo support by being pivoted about a second pivot point, a first of said connector structures disposed at a first side of said seat assembly and including 1) a seat member adapted to be fixed to the seat at said first side of the seat assembly;

2) an arm adapted to interconnect with one of said rigid members of said seat back at said first side of the seat assembly, said arm being mounted on said seat member for movement along a plurality of incremental positions about said first pivot point to enable said seat back to be reclined at varying angles with respect to said seat, said arm having a releasable locking assembly constructed and arranged to lock said rigid member against movement relative to said arm to thereby rigidly maintain said seat back in one of (1) a dress-up position wherein said seat back is inclined at a predetermined angle with respect to said seat and (2) a dump position wherein said seat back is substantially parallel in overlying relation with respect to said seat and horizontally presents its back surface to provide a horizontal cargo support, said releasable locking assembly being releasable to permit movement of said rigid member of said seat back disposed at the first side of the seat assembly with respect to said arm about said second pivot point so as to enable said seat back to be pivotally movable between said dress-up and dump positions;

3) a latch assembly constructed and arranged to lock said arm selectively into one of said incremental positions so as to set the angle at which said seat back is reclined with respect to said seat at an angle greater than said predetermined angle; and 4) a lever mechanism manually movable to (1) disable said latch assembly and thereby permit said arm to be movable along said incremental positions about said first pivot point so that said seat back can be reclined at varying angles with respect to said seat and (2) release said releasable locking assembly to permit movement of said rigid member of said seat back with respect to said arm about said second pivot point and thereby enable said seat back to be pivotally movable between said dress-up and dump positions;

said lever mechanism being manually releasable to selectively (1) enable said latch assembly to lock said arm into a selected one of said incremental positions so as to set the angle at which said seat back is reclined with respect to said seat and (2) enable said releasable locking assembly to lock said rigid member against movement relative to said arm and rigidly maintain seat back in one of said dress-up and dump positions.

16. A seat assembly according to claim 15, wherein a second of said connector structures is operatively connected with a second side of the seat assembly opposite the first side at which said first connector structure is disposed, said second connector structure including a second seat member fixed to said seat at said second side of said seat assembly, a second arm connected with an other of said rigid members of said seat back disposed at said second side of the seat assembly, said second arm being mounted on said second seat member for movement along a plurality of incremental positions to enable said seat back to be reclined at varying angles with respect to said seat, said second arm having a second releasable locking assembly constructed and arranged to lock said other rigid member against movement relative to said second arm to thereby rigidly maintain said seat back in one of (1) said dress-up position wherein said seat back is inclined at a predetermined angle with respect to said seat and (2) said dump position wherein said seat back is substantially parallel in overlying relation with respect to said seat and horizontally presents its back surface to provide a horizontal cargo support, said second releasable locking assembly being releasable to permit movement of said other rigid member of said seat back with respect to said second arm and thereby enable said seat back to be pivotally movable between said dress-up and dump positions; and a second latch assembly constructed and arranged to lock said second arm in one of said incremental positions so as to set the angle at which said seat back is reclined with respect to said seat.

17. A seat assembly according to claim 16, further comprising a cable assembly connected between said first and second connector structures so that said lever mechanism associated with said first connector structure is movable to tension said cable assembly and thereby (1) disable said second latch assembly and thereby permit said second arm to be movable along said incremental positions so that said seat back can be reclined at varying angles with respect to said seat and (2) release said releasable locking assembly to permit movement of said rigid member of said seat back with respect to said arm and thereby enable said seat back to be pivotally movable between said dress-up and dump positions;

said lever mechanism being manually releasable to selectively (1) enable said second latch assembly to lock said second arm into a selected one of said incremental positions so as to set the angle at which said seat back is reclined with respect to said seat and (2) enable said second releasable locking assembly to lock said other rigid member against movement relative to said second arm and rigidly maintain seat back in one of said dress-up and dump positions.

18. A seat assembly according to claim 17, wherein said second connector structure further comprises a second lever mechanism operatively connected with said second connector structure, each of said lever mechanisms being connected to one another through said cable assembly to enable either of said lever mechanisms to be manually movable to (1) disable each said latch assembly and thereby permit each said arm to be movable along said incremental positions about said first pivot point so that said seat back can be reclined at varying angles with respect to said seat and (2) release each said releasable locking assembly to permit movement of each rigid member of said seat back with respect to the respective arms about said second pivot point and thereby enable said seat back to be pivotally movable between said dress-up and dump positions; either of said lever mechanisms being manually releasable after being manually moved to selectively (1) enable each said latch assembly to lock the respective arms into a selected one of said incremental positions so as to set the angle at which said seat back is reclined with respect to said seat and (2) enable each said releasable locking assembly to lock each of the respective rigid members against movement relative to the respective arms and rigidly maintain said seat back in one of said dress-up and dump positions.

* * * * *